United States Patent

Lamkemeyer

[11] 3,905,643
[45] Sept. 16, 1975

[54] SADDLE

[75] Inventor: Klaus Lamkemeyer, Guetersloh, Germany

[73] Assignee: Mertens & Co. Kommanditgesellschaft, Guetersloh-Westfalen, Germany

[22] Filed: Nov. 2, 1973

[21] Appl. No.: 412,305

[30] Foreign Application Priority Data
Nov. 2, 1972 Austria .................. 9327/72

[52] U.S. Cl. ............ 297/195; 297/214; 297/DIG. 2
[51] Int. Cl.² ............................................. B62J 1/00
[58] Field of Search .......... 297/208, 209, 211, 212, 297/195, 214, DIG. 2, 195; 267/178, 167, 132, 131, 179, 180; 248/317

[56] References Cited
UNITED STATES PATENTS

| | | | |
|---|---|---|---|
| 1,432,604 | 10/1922 | Lang .................. | 267/178 |
| 1,462,925 | 7/1923 | Wilburger .................. | 267/179 X |
| 1,704,472 | 3/1929 | Grandjean .................. | 267/178 |
| 1,851,973 | 4/1932 | Brandt .................. | 267/179 X |
| 1,933,670 | 11/1933 | Holt .................. | 267/178 |
| 2,767,421 | 10/1956 | Fremstad .................. | 267/180 X |
| 2,884,045 | 4/1959 | Walsh .................. | 297/209 |
| 3,120,404 | 2/1964 | Bramming .................. | 297/188 |
| 3,157,056 | 11/1964 | Gray et al. .................. | 297/167 X |
| 3,186,701 | 6/1965 | Skinner, Sr. .................. | 267/167 |
| 3,276,761 | 10/1966 | Becker .................. | 267/167 |
| 3,341,251 | 9/1967 | Costin .................. | 297/DIG. 2 |
| 3,708,201 | 1/1973 | Lamkemeyer .................. | 297/195 |
| 3,736,417 | 5/1973 | Williams .................. | 248/317 |

FOREIGN PATENTS OR APPLICATIONS
626,107   3/1975   Germany .................. 267/179

Primary Examiner—James T. McCall
Attorney, Agent, or Firm—Edmund M. Jaskiewicz

[57] ABSTRACT

A saddle such as a bicycle saddle, having a carrier part and spring elements such as helical springs located between the carrier part and the saddle bridge near the rear end of the saddle, wherein each spring element is provided at one end with a thread like form having at least one thread convolution, which is fastened by means of a securing member having a corresponding thread to the carrier part and/or to the saddle bridge.

11 Claims, 9 Drawing Figures

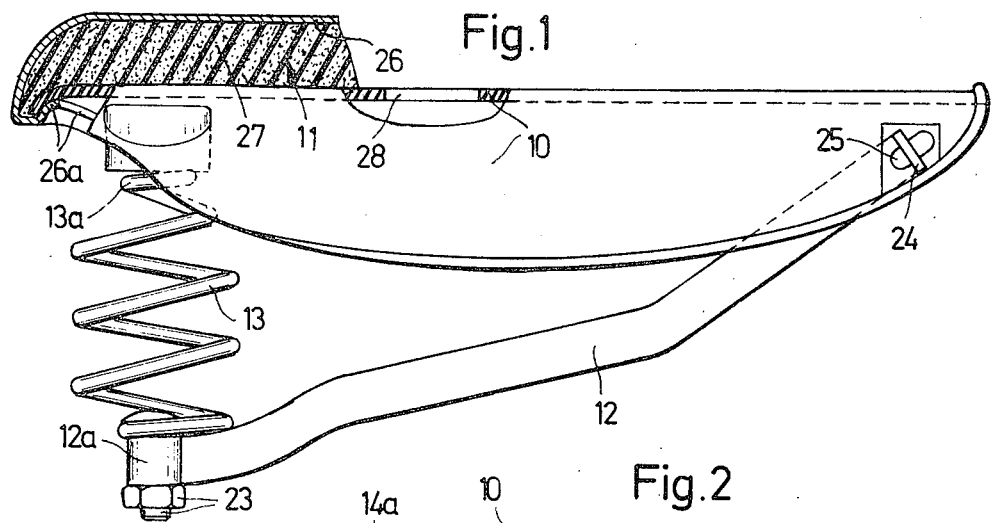
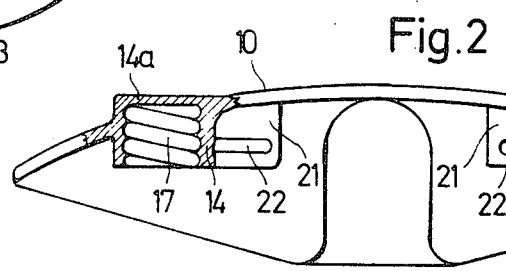
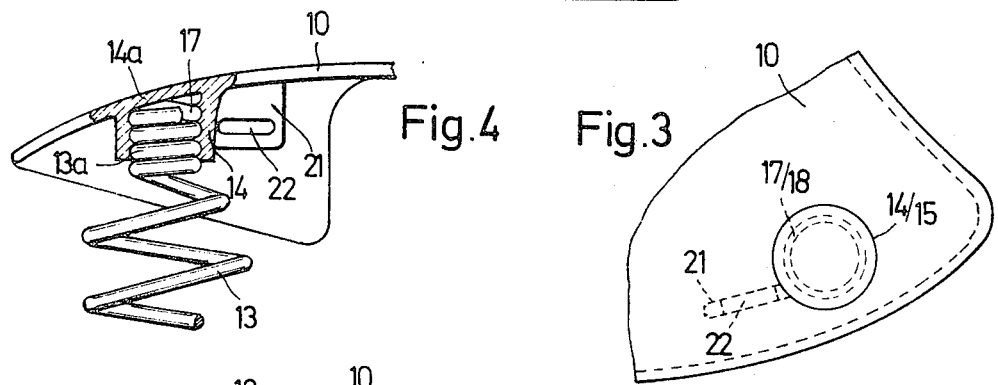
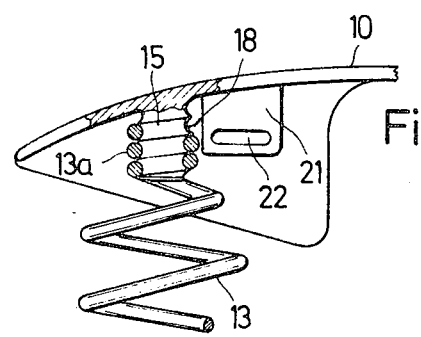
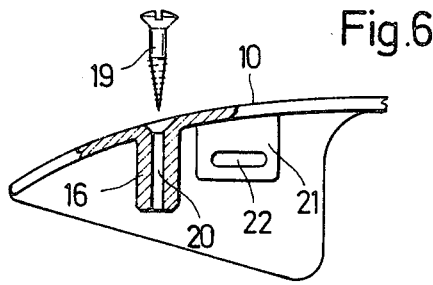
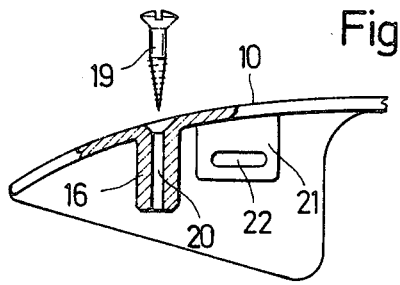

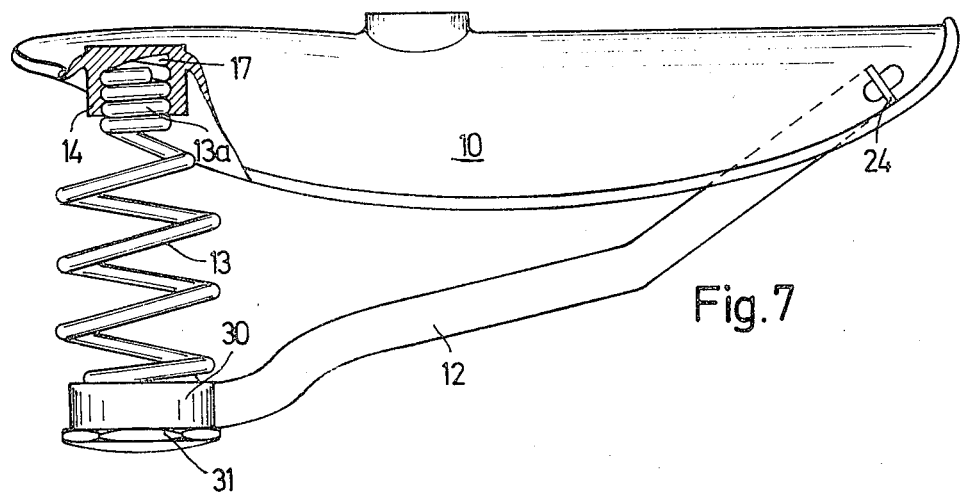
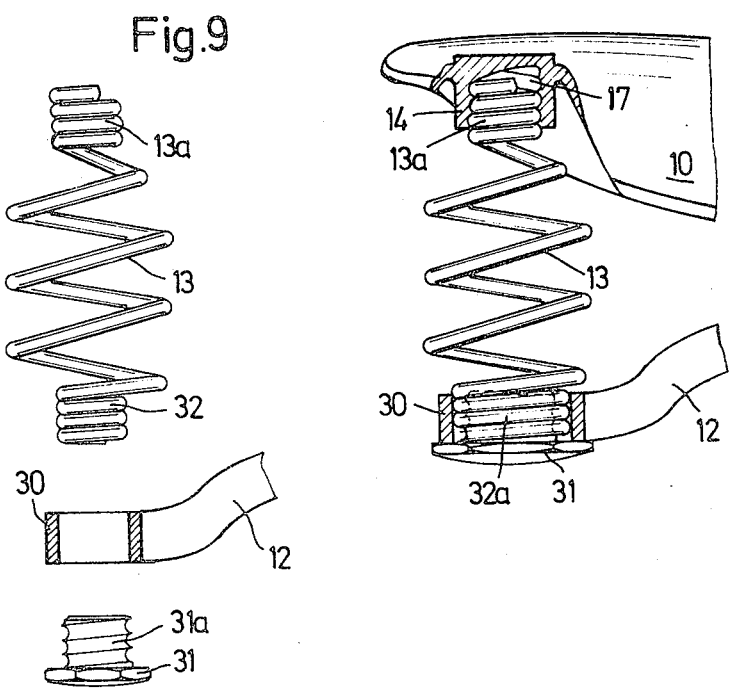

SADDLE

PRIOR APPLICATION

In Austria dated Nov. 2, 1972 and numbered A 9327/72.

The invention relates to a saddle such as a bicycle saddle, having a carrier part and springs located in the rear of the saddle between the carrier part and a saddle bridge.

In hitherto known saddles the springs are secured to the carrier and the bridge by rivets, bolts and nuts or like means which are costly and involved location of the springs on the carrier parts.

It is an object of the invention to provide an improved saddle such as a bicycle saddle, of the aforesaid kind which is provided with helical springs which are fastened in place in a simple manner to the carrier and to the saddle bridge.

According to the present invention there is provided a saddle such as a bicycle saddle, having a carrier part and spring elements such as helical springs located between the carrier part and the saddle bridge near the rear end of the saddle, wherein each spring element is provided at one end with a thread like form having at least one thread convolution, which is fastened by means of a securing member having a corresponding thread to the carrier part and/or to the saddle bridge.

Each fixing means is in the form of a socket or boss, and may have an internal or external thread.

The fixing means may be made integrally with the carrier from a plastics material.

Each helical spring is provided with an end of reduced diameter relative to the normal spring diameter, and including one or more convolutions or threads which by screw-rotation or fitting may be detachably connected to a receiving member. The pitch of the thread of the spring end is preferably different from that of the fixing recess thread (smaller or larger), so that a clamping action occurs between the spring end and the thread of the fixing recess when they are screwed together.

A spring may be attached to a plain boss by sliding it over the boss and expanding the boss by inserting a screw down the centre of the boss.

The carrier may form the seat surface, or may be provided with a padded part manufactured separately.

A saddle in accordance with the invention may be made as a saddle for a ladies, gents or child's bicycle and be given any optional shape of seat surface; this saddle is particularly suitable for bicycles, mopeds, childrens vehicles (children's toys), or for a tractor, mechanical golf caddy or lawnmower.

Examples of the invention are shown in the accompanying drawings, in which:

FIG. 1 is a side view, partly in section of a saddle having a carrier part, a padded body located thereon and spring elements provided between the carrier part and a saddle bridge, FIG. 2 is a rear end view, partly in section of the carrier part showing the socket-like receiving members for the spring elements, FIG. 3 is a plan view of a part-region of the rear carrier part with a spring receiving member, FIG. 4 is a rear end part-section of a portion of the carrier part of FIG. 3, with an inserted spring, FIG. 5 is a rear end part-section of a portion of the carrier part with a different spring receiving element, FIG. 6 is a rear end part-section of a portion of the carrier part, having a spigot-like spring receiving member, FIG. 7 is a side view, partly in section of a saddle having a helical spring inserted between carrier part and saddle bridge, FIG. 8 is a side view of the rear part of the same saddle, showing the receiving members for the helical spring in section, FIG. 9 is an exploded view of the helical spring of FIG. 8, but forming a small thread, fixable in the lug of the saddle bridge by means of a screw.

A saddle in accordance with the invention, more particularly a bicycle saddle, has a carrier part 10 with a padded seat 11 located thereon. In the rear of the saddle there are two springs 13, these being of helical form.

On the underside (the side remote from the seat) of the carrier 10 there is a receiving member 15 for each spring either in the form of a socket 14 which has its own internal thread 17, or a boss 15 having an internal thread 18, or a screw 19 which when inserted in a hole 20 causes a radial clamping effect by splaying (cross-sectional enlargement) an unthreaded boss 16.

A spring is secured to the members 14, 15 by screwing it along the threads thereon. Alternatively a spring is slid along boss 16 which is then dilated by the screw 19.

The socket 14 according to FIGS. 2 and 4 is made as a hollow socket which is provided with an internal thread 17 having several thread convolutions into which the helical spring 13 is screwed by its upper end 13a and thereby is connected to the fixing socket 14 and secured from being pulled out.

The boss 15 shown in FIG. 5 has an external thread 18 with several convolutions to which the helical spring 13 may be screwed by its upper end 13a; this upper end encloses several convolutions, so that it is secured to the external thread 18 and secured from removal.

The further receiving member 16 shown in FIG. 6 is a boss having a smooth outer surface which has a longitudinally extending central passage 20 formed therein. The spring 13 has its upper end 13a slid over the boss 16 and the screw 19, preferably a self-tapping screw, is inserted in the passage 20 from the upper end to cause an enlargement (cross-sectional increase) of the boss, this producing a radially outwards clamping action against the end 13a of the spring, resulting in fixation of the spring on its boss.

The fixing socket 14 is cup-shaped and with its base 14a located towards the top, projects partly from the arched surface of the carrier 10 (FIG. 2) or is provided with a base at the top shaped to correspond to the arcuate shape of the carrier part, so that this base 14a is flush with the surface of the carrier (FIG. 4).

It is within the scope of the invention to thicken the carrier 10 to the axial length of the fixing member 14, the internal thread for the spring end 13a being located in this increased thickness of the carrier.

It is also within the scope of the invention to locate a boss within the internally threaded fixing member 14, the boss having an external thread, so that the spring 13 is connected to the carrier by screwing into an internal thread (17) and simultaneously screwing on an outer thread (18).

The bosses 15, 16 are shown as cylindrical, but the boss 16 may also be of oval or polygonal cross-section.

To facilitate splaying of boss 16, it may be provided over a part of its length with a slot recess or, the boss 16 may be formed as an expanding dowel.

In the two rear corners of the carrier 10 there is a receiving member 14, 15 or 16, and two helical springs 13 are located on this part.

The carrier part 10 may be formed integrally of plastics material with the receiving members 14, 15, 16 as an injection moulded article.

It is also possible for the carrier part 10 and the receiving members 14, 15, 16 to be made of metal.

On the underside of the carrier there are fixing lugs 21 for securing a tool-kit bag or the like, and fixing means such as belts, or straps may also be integrally formed with the carrier 10.

These fixing lugs 21 are located at a certain distance from the members 15, 16 and each have a slot-shaped recess 22 for attachment of a tool bag. There may also be provided between two receiving members a continuous strap 21 with fixing receiving members 22 as webs.

The upper spring end 13a has at least one convolution preferably of more than one convolution, which are of reduced diameter compared to the remaining spring diameter, and form a cylindrical or conical spring end part.

The saddle bridge 12 is a single U-shaped strut member which is bent to form eyes 12a through which a bolt 23 and nut passes for fixing the bridge 12 to the ends of the helical springs 13 remote from the receiving members. The two ends of the saddle bridge 12 are each provided with a part 24 of a bayonet connection by means of which they may be detachably secured to the carrier in the region of the saddle nose. The bridge 12 at its free ends has a bent-over web 24, which laterally engages in a slot-shaped recess 25 extending at right angles to the longitudinal direction of the web of the carrier 10, so that parts 24 and 25 form a bayonet fitting.

The pad 11 comprises a cover layer 26 and a soft foamed plastics composition 27; the cover layer 26 may be formed as a separate part as a cover skin of rubber or the like, which overlaps the top of the carrier 10 and with its encircling edge 26a abuts against the underside of the carrier 10 around the edge. After the two separate saddle parts have been assembled, a foaming plastics material is injected through an opening formed in the carrier 28 to form the pad 27, adhering to the cover skin 26 and the carrier 10.

In a further embodiment the carrier 10 itself forms the seat surface and has no pad 11; the saddle then consists of the carrier 10, the saddle bridge 12 and the springs 13.

In this embodiment, to obtain a seat surface the receiving members 14, 15 are flush with the upper surface of the carrier, as shown in FIGS. 4 and 6, to prevent any obstructive parts from protruding upwards. The bayonet catch parts 24 of the saddle bridge 12 are radiussed in the saddle nose region and formed to protrude slightly so as not to obstruct. Alternatively the saddle bridge 12 is hingedly retained only on the inside on the carrier 10. This carrier 10 is not provided with an opening 28.

When using the carrier 10 as the seating surface, the carrier is preferably made resilient at least over a certain region, the region between saddle bridge side and saddle nose affording a natural resilience in the longitudinal direction of the saddle.

In the embodiment of FIGS. 7 to 9 the helical spring 13 is provided at its lower end with a thread 32 or 32a comprising several convolutions, the diameter of which is also smaller than the diameter of the central part of the helical spring 13. This thread 32 or 32a is inserted in an eye 30 of the saddle bridge 12, the diameter of which corresponds to the outer diameter of the thread 32 or 32a. This receiving member (formed as an eye) is completed by a screw 31 with screw thread 31a, the object of which is to retain the threaded part 32 or 32a in the eye 30, and if the diameter of the thread 31a is somewhat larger than the inside diameter of the threaded part 32 or 32a, it splays open this part and presses it firmly against the eye 30, so that there is a tight fit of the helical spring 13 between the carrier 10 and saddle bridge 12, with all the advantages of simple production and assembly.

The pitch of the outer or internal thread of the fixing member 14, 15 is preferably smaller or larger than the pitch of thread of the end 13a at the fixing end, so that with the spring end 13a located by screwing into or onto the fixing member 14, 15 a reliable clamping action is effected.

I claim:

1. A bicycle saddle including a saddle bridge portion and having a carrier part and helical spring elements located in the rear region of the saddle and extending between said carrier part and said saddle bridge portion, each of said spring elements being provided at one end with one or more thread convolutions forming a ring portion, said ring portion being of reduced diameter relative to the major portion of the spring element, said carrier part having a threaded extension on its underside providing a securing member for said ring portion of each of said spring elements, said threaded extension being made integral with said carrier part from plastic material, said spring element ring portion being threaded to said threaded extension, said spring element having another end and said saddle bridge having an eyelet therein receiving said spring element other end, and a threaded fastener element passing through said spring element other end and having a detachable fastener thereon engageable with said eyelet to secure said spring element to said saddle bridge.

2. A bicycle saddle as recited in claim 1, wherein each of said securing members comprises a socket having an internal thread with one or more convolutions.

3. A bicycle saddle as recited in claim 1, wherein each securing member has an outer thread having one or more convolutions.

4. A bicycle saddle as recited in claim 1, wherein said other end of said spring is provided with one or more thread convolutions forming a second ring portion also having a reduced diameter relative to the major portion of said spring element, said second ring portion being located in an eyelet of said saddle bridge and is retained therein by a threaded bolt.

5. A bicycle saddle as recited in claim 1, wherein the pitch of each convolution of the threads of said securing members differs from the pitch of the convolutions of said spring ends.

6. A bicycle saddle as recited in claim 1, wherein said securing members are sockets and have their bases located within the surface region of the carrier so as to project partly from the upper surface of the carrier.

7. A bicycle saddle as recited in claim 1, wherein said securing members are cup-shaped and have their bases located in the surface region of said carrier part flush with the surface thereof.

8. A bicycle saddle as recited in claim 1, wherein said securing members are formed as hollow studs having an external thread, their upper ends extending flush with the upper surface of said carrier.

9. A bicycle saddle as recited in claim 1, wherein a padded support in the form of a padded member of foamed plastics and a cover skin covering is located on said carrier.

10. A bicycle saddle as recited in claim 9, wherein said carrier is provided with an injection opening for soft plastics foam to be injected between said carrier and said cover skin, the parts forming a unitary whole during manufacture.

11. A bicycle saddle as recited in claim 1, wherein said carrier is rigid.

* * * * *